United States Patent
Rich

[15] 3,656,014
[45] Apr. 11, 1972

[54] DAMPING APPARATUS FOR A LINEAR STEP MOTOR HAVING TWO TRANSLATIONAL DEGREES OF FREEDOM

[72] Inventor: Leonard G. Rich, West Hartford, Conn.
[73] Assignee: The Gerber Scientific Instrument Company, South Windsor, Conn.
[22] Filed: Apr. 8, 1971
[21] Appl. No.: 132,344

[52] U.S. Cl. ...................................310/13, 318/623, 188/1 B
[51] Int. Cl. ..............................................................H02k 41/02
[58] Field of Search ..............................300/12–14; 318/38, 318/687, 623, 135; 188/1 R, 1 B

[56] References Cited

UNITED STATES PATENTS

| | | | |
|---|---|---|---|
| 989,958 | 4/1911 | Frahm | 188/1 R |
| 3,160,233 | 12/1964 | Norman et al. | 188/1 B |
| 3,376,578 | 4/1968 | Sawyer | 310/13 X |
| 3,457,482 | 7/1969 | Sawyer | 310/13 X |
| 3,495,475 | 2/1970 | Rumsey | 188/1 B |
| 3,554,855 | 1/1971 | Oberst et al. | 188/1 B |

*Primary Examiner*—D. F. Duggan
*Attorney*—McCormick, Paulding & Huber

[57] ABSTRACT

A viscoelastic damping apparatus is mounted to a structure which is moved by at least two linear step motor armatures in a step-by-step manner simultaneously or sequentially in each of two coordinate directions. The step motor armatures each include electromagnetic motor poles which are excited in a phased sequence to produce movements of the structure in the two coordinate directions. The damping apparatus is composed of inertial mass and a viscoelastic member which connects the mass to the structure to resiliently damp the stepping movements of the structure.

6 Claims, 4 Drawing Figures

Patented April 11, 1972 3,656,014

INVENTOR
LEONARD G. RICH

BY McCormick, Paulding & Huber

ATTORNEYS 3,656,014

DAMPING APPARATUS FOR A LINEAR STEP MOTOR HAVING TWO TRANSLATIONAL DEGREES OF FREEDOM

BACKGROUND OF THE INVENTION

This invention relates to the field of electric motors and, more particularly, is concerned with motors of the impulse type, commonly referred to as step motors, wherein the armature of the motor is moved in a number of discrete displacements or steps as a result of a corresponding number of discrete changes in the electrical energization scheme of the motor pole windings.

In flat or linear step motors of the type to which the present invention is directed, the motor is composed generally of a movable armature, which is usually connected to a mechanical load, and a base or platen having a number of magnetically permeable poles or teeth. A suitable electrical drive logic or control unit which forms a part of the stepping motor drive system operates to excite the windings of the motor poles on the armature in such a manner that a magnetic field is created which produces magnetomotive forces between the armature and platen and urges the armature to assume a mechanical position corresponding to a stable magnetic-mechanical configuration, that is, a mechanical position which results in maximum magnetic flux and maximum permeability. The control unit changes the excitation state or condition of the motor poles in a phased sequence to cause the armature to move in a step-by-step fashion between several different mechanical positions each of which has a stable magnetic-mechanical configuration.

The number of stable positions depends upon the particular geometry of the motor armature and the platen over which the armature moves in a stepwise manner; however, a number of discrete excitation steps, each corresponding to a stable position, composes a complete cycle of electrical excitation and each electrical excitation cycle is associated with a specific displacement of the armature over the platen. By repeating the excitation cycle a number of times, the armature can be caused to execute a displacement of any desired length within the mechanical boundaries of the platen. By providing at least two step motor armatures on a single structure, each armature being associated with a particular coordinate direction on the platen, the structure can be caused to move in each of the coordinate directions either simultaneously or sequentially, first in one direction and then in the other direction, so that the structure is provided with two translational degrees of freedom.

Because there are a finite number of discrete displacements and corresponding stable magnetic-mechanical configurations associated with each cycle of electrical excitation, a motor armature and a structure to which it is connected are urged to make an instantaneous movement toward a newly commanded position after each step change in the excitation of the motor pole windings. Assuming no static load on the motor armature and no damping, the motor armature responds to the step change by accelerating toward the newly commanded position until that position is reached. At the commanded position, the force on the armature due to the magnetic field is reduced to zero; however, the kinetic energy acquired by the armature during acceleration toward the commanded position carries the armature past the position and a force reversal occurs to return the armature toward the commanded position. The reversal of the forces on the armature retards the overshooting motion of the armature until the kinetic energy is entirely converted to potential energy in the magnetic field in the vicinity of the new position. At this point, the armature accelerates back toward the commanded position and again overshoots the commanded position but in the opposite direction from the first overshoot. Such oscillatory motion of the armature about the commanded position continues until the energy of the system has been dissipated in the same manner as that in a classical mass-spring system.

The oscillation and overshoot of the armature at a newly commanded position is ordinarily not desirable and may degrade the output of the step motor, particularly at low motor speeds, to a point which makes the motor unacceptable for functions such as controlling the movement of a tool or plotting stylus in programs which include low velocity routines in one or more of the coordinate directions along which movement takes place.

Accordingly, it is desirable to have a damped step motor armature which eliminates the undesirable oscillatory overshoot normally associated with the discrete displacements of the armature in each coordinate direction.

SUMMARY OF THE INVENTION

The present invention resides in an apparatus for damping the oscillatory overshooting movements of linear step motor armatures which translate a structure having at least two translational degrees of freedom respectively along two coordinate directions. The linear step motors are individually associated with one of the coordinate directions and move the structure in a step-by-step manner in the two coordinate directions by excitation of the electromagnetic motor poles of the armature in phased sequences. The apparatus which provides damping for the motor armatures is comprised of an inertial mass, a resilient means interposed between the inertial mass and the structure for resiliently restraining movements of the inertial mass relative to the structure in each of the coordinate directions, and viscous damping means also interposed between the inertial mass and the structure for viscously damping the movements of the inertial mass relative to the structure in each of the coordiante directions. The resilient means and the viscous damping means preferably consist of a viscoelastic member which when coupled between the inertial mass and the structure serves both the resilient restraining function and the viscous damping function so that oscillatory movements of the structure in each of the coordinate directions are damped by the combined inertial and viscoelastic elements.

DESCRIPTION OF THE PREFERRED EMBODIMENTS

Figures 1, 2:
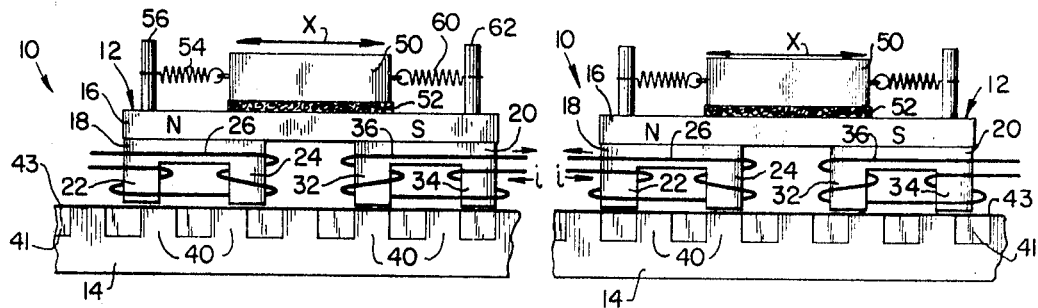
FIG. 1 is a chematic representation of a linear step motor employing the damping apparatus of the present invention, the step motor armature, being shown located over a cooperating platen in one of its stable commanded positions.
FIG. 2 is a schematic representation of the linear step motor shown in FIG. 1 after the armature has moved a single step to the left in FIG. 1 to the next stable commanded position.

FIGS. 1 and 2 disclose a linear step motor, generally designated 10, which is capable of translating an associated structure attached to the armature, such as a plotting head or the like, back and forth in one or more coordinate directions, one of which is identified by the arrows as the X direction. The associated structure is not shown in the drawings since it forms no part of the present invention.

Before discussing the present invention in detail, it will first be advantageous to discuss the construction and operation of a linear step motor. The linear step motor 10 is composed principally of a linear step motor armature 12 and a base or platen 14 over which the armature translates. The armature 12 is composed of three principal parts; a permanent magnet 16 and two electromagnets 18 and 20. The permanent magnet 16 has a north pole indicated by the letter N at one end portion and a south pole indicated by the letter S located at the other end portion opposite the north pole. The two magnetic poles of the permanent magnet 16 are aligned along the X direction and the electromagnets 18 and 20 are attached to the permanent magnet adjacent the magnetic north and south poles respectively. The electromagnet 18 forms two motor poles 22 and 24 and includes an excitation winding 26 having two serially connected coils which respectively wrap around the two motor poles in opposite directions. A current passing through the winding 26 generates a magnetic field in the motor poles 22 and 24 which is superimposed on the magnetic field of the permanent magnet 16. The electromagnet 20 has the same construction as electromagnet 18 and includes motor poles 32 and 34 and a winding 36 which forms oppositely wound coils on the two motor poles so that excitation of the winding generates a magnetic field which is also superimposed on the magnetic field of the permanent magnet 16.

The base or platen 14 over which the step motor armature 12 translates is formed from a magnetically permeable material and includes a plurality of poles or teeth 40 which project upwardly to a common plane extending parallel to the X direction. The spaces between the teeth are filled with a nonmagnetic material 41, such as plastic, which also preferably thereby covers the polefaces of the teeth, to form a smooth surface 43 over which the armatures slide. The teeth 40 are spaced in the X direction by a distance equal to the width of the teeth. The motor poles 22,24, or 32, 34 on the respective electromagnets are separated in the X direction by twice the width of the teeth 40 so that one of the poles, such as pole 32 in FIG. 1, may be aligned with one of the teeth 40 while the other pole, such as pole 34 in FIG. 1, registers with the space between the teeth 40. Furthermore, it will be noted that the electromagnets 18 and 20 are separated in the X direction by an amount which causes the motor poles of one electromagnet, such as poles 22 and 24, to assume positions symmetrically positioned over and partially aligned with two teeth 40 when the motor poles on the other electromagnet, such as motor poles 32 and 34, are precisely aligned with a tooth and a space between the teeth 40 respectively. A brief examination of this geometric relationship or "pitch" of the motor poles and teeth makes clear the fact that the motor poles of one electromagnet assume aligned positions with a tooth and a space between the teeth alternately with the motor poles of the other electromagnet during a sequence of discrete steps or displacements in the X direction, each displacement having a dimension equal to one-half of a tooth width. As seen in FIG. 2 where the armature 12 is displaced by a half tooth width to the left from that shown in FIG. 1, the motor poles 22 and 24 on electromagnet 18 assume aligned positions with a space and a tooth respectively while the motor poles 32 and 34 on electromagnet 20 are each partially aligned with a pair of teeth. It will also be noted that during movements in either direction, the geometry of the teeth and motor poles alternates the motor pole aligned with a tooth between the two motor poles on any one electromagnet.

By appropriate excitation of the windings 26 and 36 of the electromagnets 18 and 20, it is possible to establish a preferred positioning of the motor armature and teeth in any one of four positions permitted by the geometry of the step motor. In each preferred position, one of the motor poles is aligned with a tooth of the platen 14. By appropriately exciting the motor pole windings in a phased sequence, it is possible to index or step the motor armature sequentially between the four positions and by repeating the excitation cycle, the motion of the armature continues in one direction as one cycle of discrete displacements follows another.

In particular, to produce the stepping motion in one direction, the permanent magnet 16 generates a flux path of its own through the motor poles of each electro-magnet and the electromagnetically permeable platen 14. The magnetic flux from the permanent magnet 16 establishes two north poles of substantially equal strength in the motor poles 22 and 24 and two south poles at the motor poles 32 and 34 in the absence of any excitation of the windings 26 and 36. However, the magnetic flux in poles 32 and 34 is modulated by the winding 36 which superimposes an additional magnetic field on the field of magnet 16. By exciting the winding 36 with a current $i$ of appropriate magnitude in the direction indicated in FIG. 1, it is possible to reduce the magnetic field strength or flux through pole 34 to zero and double the magnetic flux through the pole 32. In this phase of electrical excitation, the pole 32 assumes a preferred position in alignment with one of the teeth 40 in a stable, magnetic-mechanical configuration associated with maximum flux and maximum permeability. The movement to this preferred position assumes that no external loads are applied to the armature 12. At the same time, the motor poles 22 and 24 assume positions which are symmetric with respect to two of the teeth 40 as seen in FIG. 1 which is a neutrally stable position in which the flux through each of the poles is equal.

In order to index the step motor armature 12 by one step to the left, it is merely necessary that winding 26 of electromagnet 18 be excited with a current $i$ having the appropriate magnitude and the direction indicated in FIG. 2. In such condition, the motor pole 24 acquires a preferred position in alignment with one of the teeth 40 due to the reinforcement of the flux through the pole 24 and cancellation or reduction of the flux through pole 22. At the same time, the motor poles 32 and 34 of the electromagnet 20 are de-energized and assume a symmetric and stable position over two of the platen teeth.

The armature 12 is stepped again to the left by de-energizing winding 26 and re-energizing winding 36 with a current $i$ of the same magnitude but a polarity or sense reversed from that shown in FIG. 1. Such excitation causes motor pole 34 to assume a preferred position in alignment with a platen tooth 40. Subsequent excitation of the winding 26 on the electromagnet 18 with a current $i$ having the same magnitude but a polarity reversed from that shown in FIG. 2 produces a further step to the left and brings motor pole 22 into alignment with a platen tooth 40 to complete one electrical excitation cycle and a corresponding displacement of the armature 12 by an amount equal to one space and one tooth 40. The resolution of the displacements can be refined by subdividing each of the motor poles into a plurality of teeth and providing teeth of corresponding size on the platen.

It will, of course, be readily understood that displacements of armature 12 to the left can be continued by repeating the same electrical excitation cycle described above. The extent of such displacement is limited by the length of the platen 14 in the X direction and the available cabling needed to excite the electromagnets 18 and 20. The sense of motion in the X direction may be reversed at any phase of the electrical excitation cycle simply by reversing the excitation sequence. While one step motor is generally limited to motions in a single coordinate direction, another step motor connected perpendicularly to the step motor 12 could be utilized to move the attached structure in another coordinate direction perpendicular to the X direction.

With an understanding of the operation of a linear step motor, it will be appreciated that the discrete displacements of the armature 12 in the step-by-step fashion described may be accompanied by overshoot of the armature at each stable position, particularly at low velocities. Such overshoot may be particularly undesirable on certain instruments such as a plotting head which has two translational degrees of freedom in two coordinate directions respectively since the oscillations in one coordinate direction introduce a waviness in plotted lines extending in the other coordinate direction and may distort printed, numerical or other data beyond recognition.

The damping apparatus of the present invention is employed to improve the displacement characteristics of a structure which is translated in at least two coordinate directions by means of linear step motor armatures associated respectively with each of the coordinate directions. The apparatus, as embodied in the step motor 10 in FIG. 1, includes an inertial mass 50 and a viscoelastic mat 52 which is interposed between the mass and the armature 12. The viscoelastic mat 52 is composed of a type of rubber which is readily available on the commercial market and is frequently characterized as a "dead" rubber which, in addition to its elastic properties, also possesses damping characteristics due to the manner in which it dissipates energy when elastically deformed. The mat 52 is bonded at its lower surface to the confronting surface of the armature 12 and is also bonded at its upper surface to the confronting portion of the inertial mass 50. With the mass being serially connected through the mat 52 to the step motor armature 12, the mass generally follows the armature movements in the X direction while slight relative movements between the mass and armature are accommodated by shearing motions in the mat 52. The shearing motions accompany two distinct functions performed by the mat. Firstly, because of its elastic character, the mat 52 resiliently restrains relative movements between the mass and armature and urges the mass toward a central position on the armature. Secondly, the viscous character of the mat in combination with the elastic character generates damping forces on the relative movements between the mass and armature and the damping forces in turn damp the actual displacements of the armature 12 in the X direction.

The system parameters may be tuned to the stepping frequency of the armature at a speed where overshoot is particularly undesirable. If it is desirable to vary the resilient characteristics from those of the mat 52 along, a coil spring 54 connected between the armature 12 and mass 50 by means of a post 56 and a cooperating coil spring 60 extending from the opposite side of the mass to the armature through a post 62 may be provided. By placing the springs 54 and 60 in tension, an additional spring constant is combined with the spring constant of the mat 52.

Figure 3:
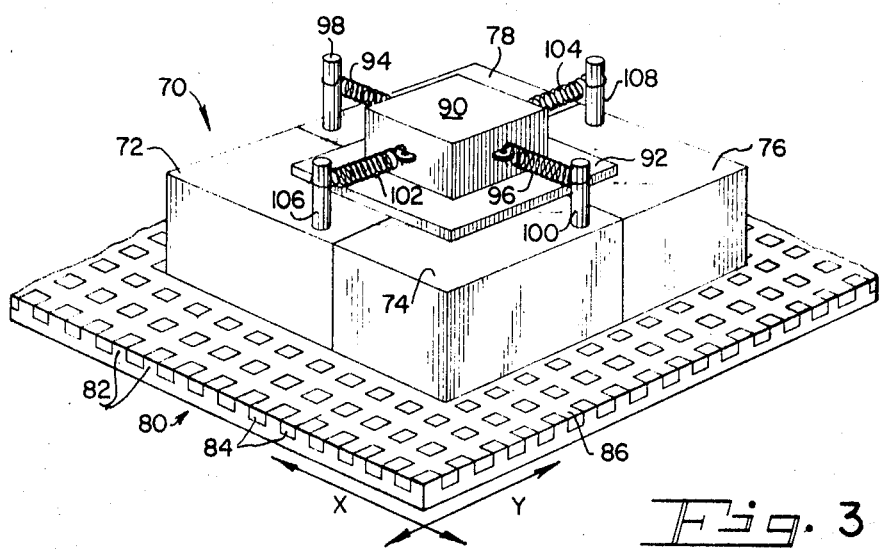
FIG. 3 is a perspective view of a step motor structure which can be moved in each of two coordinate directions by means of a plurality of linear step motor armatures and which embodies apparatus comprising the present invention.

FIG. 3 shows a linear step motor system in which a structure having two translational degrees of freedom along two coordinate directions respectively embodies the damping apparatus according to the present invention. The structure generally designated 70, includes four linear step motor armatures 72,74,76, and 78 which are arranged in a unitary, rectangular body that can be translated over a platen 80. The platen 80 is composed of a plurality of interconnected and magnetically permeable teeth 82 which are enveloped by a nonmagnetic material 84 filling the interstices between teeth to form a smooth surface 86 over which the structure 70 may be translated. If desired, a fluid cushion between the armature and platen may be generated by directing streams of fluid from a pressure source, such as an air pump, downwardly through the structure 70 onto the surface 86 of the platen 80.

Each of the step motor armatures 72,74,76, and 78 has a construction similar to that of the armature 12 in FIGS. 1 and 2 and operates in the same manner as the armature 12. The motor poles, the excitation coils and the connecting cables are not shown for simplicity. The step motor armatures are arranged and operated in diagonal pairs so that armatures 72 and 76 move the structure 70 in the X direction and the armatures 74 and 78 move the structure in the Y direction. Each diagonal pair can be operated either individually or simultaneously with the other pair to produce displacements of the structure 70 along either or both of the X and Y directions. When the four poles are operated simultaneously the structure moves along a resultant having components corresponding to the respective movements generated by each pair of armatures in the X and Y direction.

The structure 70 is composed of pairs of armatures in order to provide rotational stability about an axis normal to the X and Y directions on the platen 80. It will be understood that if other means are provided for maintaining the rotational alignment of the structure on the platen, such means including for example, guide rails or guide wires which move over the platen with the structure 70, then only one step motor armature is needed to produce movement in a given coordinate direction. Accordingly, with a structure which has two degrees of freedom, such as shown, at least two armatures of the type shown in FIGS. 1 and 2 are utilized.

The means of FIG. 3 which provides the damping function in each of the coordinate directions according to the present invention is composed of an inertial mass 90, and a viscoelastic mat 92 which is serially interposed between the mass 90 and structure 70 along an axis normal to the X and Y directions. The mat 92 is secured to the structure 70 by means of a bonding compound at the confronting surface of the mat and structure and is similarly secured to the mass 90. Relative movements between the mass 90 and the structure 70 in both the X direction and the Y direction place the intervening mat 92 in shear. Such distortion of the mat damps the motions of the structure in each of the X and Y directions as well as motions having components in both the X and Y direction. In order to change the resiliency characteristics in the X direction, springs 94 and 96 are connected between the mass and structure by means of posts 98 and 100, respectively. In a similar respect, the resiliency characteristics in the Y direction are modified by springs 102 and 104 connected between the mass and structure by means of posts 106 and 108, respectively. Where the structure 70 is employed as a plotting head having a plotting stylus which contacts a sheet of drafting paper on the platen 80, the damping apparatus improves the character of the plot by reducing oscillations which accompany the stepping motions in both coordinate directions.

Figure 4:
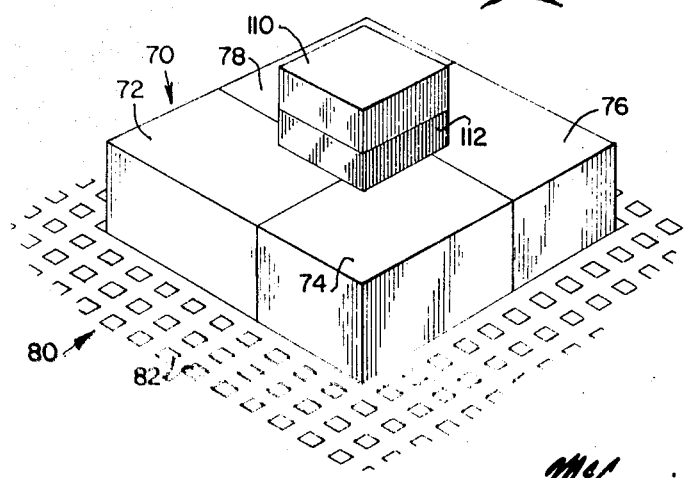
FIG. 4 is a perspective view of the step motor structure shown in FIG. 3 with an alternate embodiment of the present invention.

FIG. 4 shows an alternate embodiment of the damping apparatus composed of an inertial mass 110 and a viscoelastic member 112 interposed serially between the mass and the structure 70. The structure 70 and the platen 80 have the same construction and operate in the same manner as described in FIG. 3. The damping apparatus differs principally from the apparatus shown in FIG. 3 in that the retaining springs extending between the mass and structure have been eliminated and the viscoelastic member 112 is the sole means of elastic restraint between the mass and structure. While the dynamic characteristics of the damping apparatus in FIG. 4 are not as versatile as the apparatus shown in FIG. 3, the damping function is provided in both the X and Y directions and is adequate for many systems where a particular tuning of the damping system is not critical.

While the damping apparatus of the present invention has been disclosed in several embodiments, it should be understood that various modifications and substitutions may be had without departing from the spirit of the invention. For example, although the viscoelastic mat is described as being bonded to both the inertial mass and the armature structure, it is possible that other means for holding the mat interposed between the mass and armature structure may be utilized and friction between the mat and the mass or structure could provide the necessary coupling to place the mat in shear. Still further, other electrical or mechanical damping arrangements may be incorporated with the apparatus disclosed to further improve the damping function. Accordingly, it will be understood that the present invention has been disclosed in several embodiments merely by way of illustration rather than limitation.

I claim:

1. In a linear step motor system in which a structure including at least two linear step motor armatures and having two degrees of translational freedom respectively along two coordinate directions is moved in a step-by-step manner in each of the two coordinate directions by exciting the electromagnetic motor poles of the armatures in phased sequences, the improvement comprising: an inertial mass; resilient means interposed between said inertial mass and the structure for resiliently restraining movements of the inertial mass relative to the structure in each of the coordinate directions; and viscous damping means interposed between the inertial mass and the structure for viscously damping the movements of the inertial mass relative to the structure in each of the coordinate directions.

2. An improvement as defined in claim 1 wherein said resilient means and said viscous damping means include a viscoelastic member coupled between said inertial mass and the structure.

3. An improvement as defined in claim 2 wherein said inertial mass and said viscoelastic member are positioned serially along an axis extending perpendicular to each of the two coordinate directions in which the structure is moved in a step-by-step manner.

4. An improvement as defined in claim 2 wherein said viscoelastic member is bonded to the structure including the linear step motor armatures.

5. An improvement as defined in claim 2 wherein said viscoelastic member is bonded to said inertial mass.

6. An improvement as defined in claim 2 wherein said resilient means also includes spring restraining means connected between the structure and said inertial mass for resiliently restraining movements of the inertial mass relative to the structure.

* * * * *